US009728941B2

(12) United States Patent
Lykowski et al.

(10) Patent No.: US 9,728,941 B2
(45) Date of Patent: Aug. 8, 2017

(54) IGNITER ASSEMBLY INCLUDING ARCING REDUCTION FEATURES

(71) Applicant: Federal-Mogul Ignition Company, Southfield, MI (US)

(72) Inventors: James Lykowski, Temperance, MI (US); Keith Hampton, Ann Arbor, MI (US)

(73) Assignee: Federal-Mogul Ignition Company, Southfield, MI (US)

( * ) Notice: Subject to any disclaimer, the term of this patent is extended or adjusted under 35 U.S.C. 154(b) by 229 days.

(21) Appl. No.: 14/540,861

(22) Filed: Nov. 13, 2014

(65) Prior Publication Data

US 2015/0068025 A1 Mar. 12, 2015

Related U.S. Application Data

(62) Division of application No. 13/116,269, filed on May 26, 2011, now Pat. No. 8,890,397.

(60) Provisional application No. 61/348,330, filed on May 26, 2010.

(51) Int. Cl.

| | |
|---|---|
| ***H01S 4/00*** | (2006.01) |
| ***H01T 21/02*** | (2006.01) |
| ***H01T 13/06*** | (2006.01) |
| ***H01T 13/52*** | (2006.01) |
| ***H01T 19/00*** | (2006.01) |

(52) U.S. Cl.
CPC ............ *H01T 21/02* (2013.01); *H01T 13/06* (2013.01); *H01T 13/52* (2013.01); *H01T 19/00* (2013.01); *Y10T 29/49002* (2015.01)

(58) Field of Classification Search
CPC ......... H01T 21/02; H01T 19/00; H01T 13/06; H01T 13/52; Y10T 29/49002
USPC ................................. 29/592.1; 313/118–145
See application file for complete search history.

(56) References Cited

U.S. PATENT DOCUMENTS

| | | | |
|---|---|---|---|
| 1,633,435 | A | 6/1927 | De Alcocer et al. |
| 1,790,846 | A | 2/1931 | Sciuto |
| 1,862,981 | A | 6/1932 | Rabezzana |
| 1,927,621 | A | 9/1933 | Wahl |
| 2,312,103 | A | 2/1943 | Kushler |
| 2,360,390 | A | 10/1944 | Berstler |
| 2,723,364 | A | 11/1955 | Cipriani et al. |
| 2,894,315 | A | 7/1959 | Candelise |
| 3,254,154 | A | 5/1966 | Boggs |

(Continued)

FOREIGN PATENT DOCUMENTS

FR 2859831 A1 9/2012

*Primary Examiner* — Peter DungBa Vo
*Assistant Examiner* — Azm Parvez
(74) *Attorney, Agent, or Firm* — Robert L. Stearns; Dickinson Wright, PLLC

(57) ABSTRACT

A corona igniter (20) includes a metal shell (32) with a corona reducing lip (38) spaced from an insulator (26) and being free of sharp edges (40) to prevent arcing (42) in a rollover region and concentrate the electrical field at an electrode firing end (48). The corona reducing lip (38) includes lip outer surfaces (88) being round, convex, concave, or curving continuously with smooth transitions (90) therebetween. The corona reducing lip (38) includes lip outer surfaces (88) presenting spherical lip radii ($r_1$) being at least 0.004 inches. The corona igniter (20) also includes shell inner surfaces (104) and insulator outer surfaces (75) facing one another being free of sharp edges (40).

18 Claims, 11 Drawing Sheets

(56) References Cited

U.S. PATENT DOCUMENTS

| | | | |
|---|---|---|---|
| 3,541,110 | A | 11/1970 | Bell et al. |
| 7,710,006 | B2 | 5/2010 | Kyuno et al. |
| 2005/0189858 | A1 | 9/2005 | Chang et al. |
| 2007/0040487 | A1 | 2/2007 | Kyuno et al. |
| 2007/0046162 | A1* | 3/2007 | Moribe .................. H01T 13/36 313/143 |
| 2009/0102345 | A1 | 4/2009 | Hotta et al. |
| 2009/0167135 | A1 | 7/2009 | Morin |
| 2010/0083942 | A1 | 4/2010 | Lykowski |

* cited by examiner

IGNITER ASSEMBLY INCLUDING ARCING REDUCTION FEATURES

CROSS REFERENCE TO RELATED APPLICATION

This U.S. Divisional Application claims the benefit of U.S. Utility application Ser. No. 13/116,269, filed May 26, 2011 and U.S. Provisional Application Ser. No. 61/348,330 filed May 26, 2010, the entire contents of which are hereby incorporated by reference.

BACKGROUND OF THE INVENTION

1. Field of the Invention

This invention relates generally to a corona discharge igniter for receiving a voltage from a power source and emitting an electrical field for ionizing and igniting a mixture of fuel and air of an internal combustion engine, and methods of manufacturing the same.

2. Description of the Prior Art

An igniter of a corona discharge ignition system receives a voltage from a power source and emits an electrical field that forms a corona to ionize a mixture of fuel and air of an internal combustion engine. The igniter includes an electrode body portion extending longitudinally form an electrode terminal end to an electrode firing end. An insulator is disposed along the electrode body portion, and a shell is disposed along the insulator from an upper shell end to a lower shell end. The lower shell end faces toward the electrode firing end. The shell includes a lip at the upper shell end, in an area of the igniter known as a rollover region.

The electrode terminal end receives the voltage from the power source and the electrode firing end emits the electrical field that forms the corona. The electrical field includes at least one streamer, and typically a plurality of streamers forming the corona. The corona igniter does not include any grounded electrode element in close proximity to the electrode firing end. Rather, the mixture of air and fuel is ignited along the entire length of the high electrical field generated from the electrode firing end. An example of the igniter is disclosed in U.S. Patent Application Publication No. US 2010/0083942 to the present inventors, Lykowski and Hampton.

For internal combustion engine applications, it is desirable to concentrate the electrical field emissions at the electrode firing end. However, as shown in Prior Art FIG. 2, some electrical field emissions often occur in the rollover region, for example in the air surrounding the lip of the shell. These electrical field emission are referred to as arcing, or irregular corona, which is undesirable for many internal combustion engine applications. The irregular corona or arcing can degrade the quality of the ignition of the mixture of fuel and air.

SUMMARY OF THE INVENTION

The invention provides for an igniter for receiving a voltage from a power source and emitting an electrical field that forms a corona to ionize a mixture of fuel and air of an internal combustion engine. The igniter includes an electrode including an electrode body portion extending longitudinally from an electrode terminal end to an electrode firing end, an insulator disposed along the electrode body portion, and a shell disposed along the insulator from an upper shell end to a lower shell end. The lower shell end faces toward the electrode firing end. The shell includes a corona reducing lip at the upper shell end being free of sharp edges.

The invention also provides for a method of forming an igniter for receiving a voltage from a power source and emitting an electrical field that forms a corona to ionize a mixture of fuel and air of an internal combustion engine. The method includes providing a shell extending longitudinally from an upper shell end to a lower shell end; disposing an insulator in the shell; disposing an electrode including an electrode body portion extending longitudinally from an electrode terminal end to an electrode firing end in the insulator such that the lower shell end faces toward the electrode firing end. The method further includes forming a corona reducing lip at the upper shell end to be free of sharp edges.

The inventive igniter provides less arcing and irregular corona in the rollover region due to the corona reducing lip being free of sharp edges, compared to the prior art igniters of Prior Art FIG. 2and the '942 published application, which include sharp edges in the rollover region. The electrical field emissions from the inventive igniter are more concentrated at the electrode firing end, which allows the igniter to emit a more consistent and stronger electrical field from the electrode firing end, compared to the prior art igniters. For example, the inventive igniter emits a stronger electrical field from the electrode firing end at 30 volts than the prior art igniters of the '942 published application do at 50 volts. Thus, the inventive igniter is more efficient and provides significant energy cost savings relative to the prior art igniters. The inventive igniter also provides a higher quality ignition and better, more stable performance over time than the prior art igniters.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
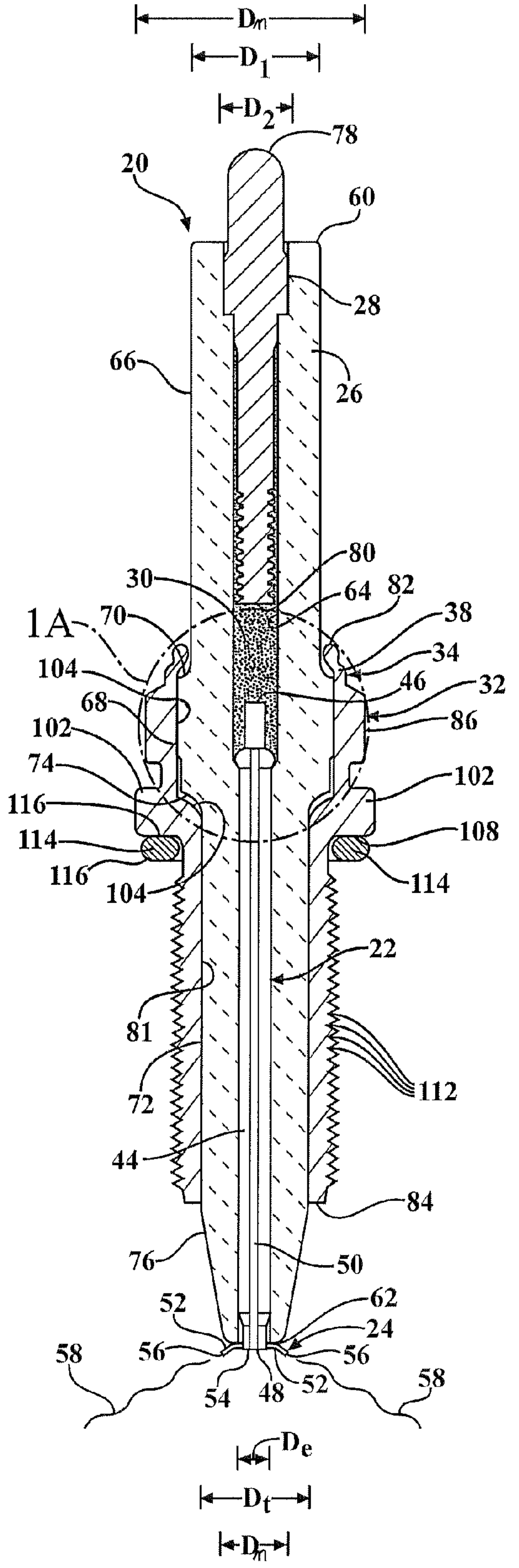
FIG. 1 is a cross-sectional view of an igniter in accordance with one aspect of the invention.

A corona ignition system includes an igniter 20, as shown in FIG. 1, installed in a cylinder head (not shown) and projecting into a combustion chamber of an internal combustion engine (not shown). The igniter 20 receives a voltage from a power source and emits an electrical field that forms a corona in the surrounding air of the combustion chamber. When fuel is supplied to the combustion chamber, the corona ionizes and ignites the mixture of fuel and air along the entire length of the electrical field. The igniter 20 includes an electrode 22 with a corona enhancing tip 24 and an insulator 26 around the electrode 22. A terminal 28 and a resistor layer 30 are received in the insulator 26, and a shell 32 is disposed around the insulator 26. The shell 32 has an upper flange 34 in a rollover region of the igniter 20. The upper flange 34 comprises a corona reducing lip 38 being free of sharp edges 40 to prevent arcing 42 in the air surrounding the rollover region, unlike lips of the prior art which include sharp edges 40. At least a portion of the corona reducing lip 38 is spaced from the insulator 26, and shell sealing gaskets 36 can be disposed between the shell 32 and the insulator 26, as shown in FIGS. 3 and 5A-5C. In one preferred embodiment, the shell 32 includes no sharp edges facing the insulator 26, and the insulator 26 includes no sharp edges 40 facing the shell 32.

Figure 1A:
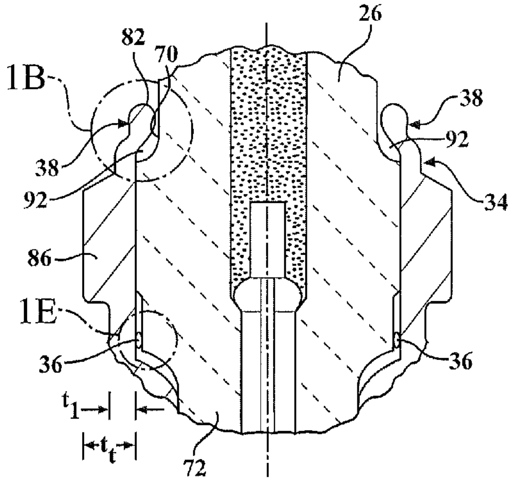
FIG. 1A is an enlarged view of a rollover region of the igniter of FIG. 1.
Figure 1B:
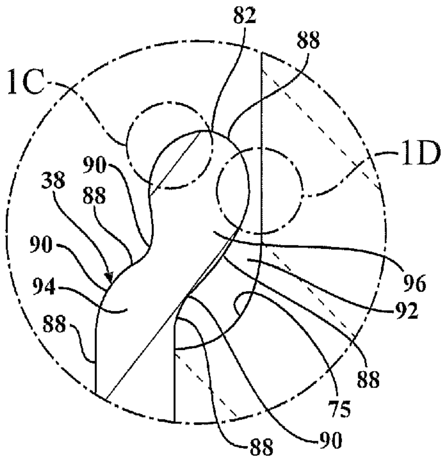
FIG. 1B is an enlarged view of a corona reducing lip of the rollover region of FIG. 1A.
Figure 1C:
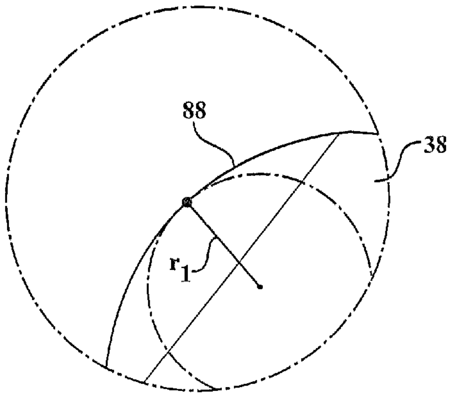
FIG. 1C is an enlarged view of a portion of the corona reducing lip of FIG. 1B showing a spherical lip radius.
Figure 1D:
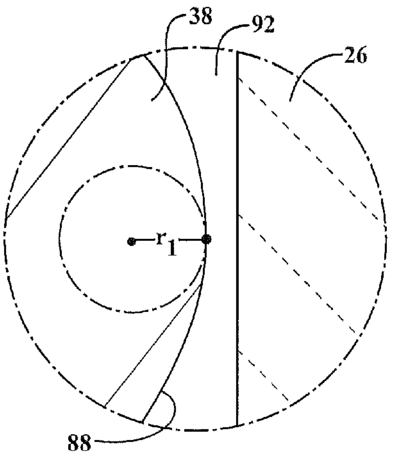
FIG. 1D is an enlarged view of another portion of the corona reducing lip of FIG. 1B showing another spherical lip radius.
Figure 1E:
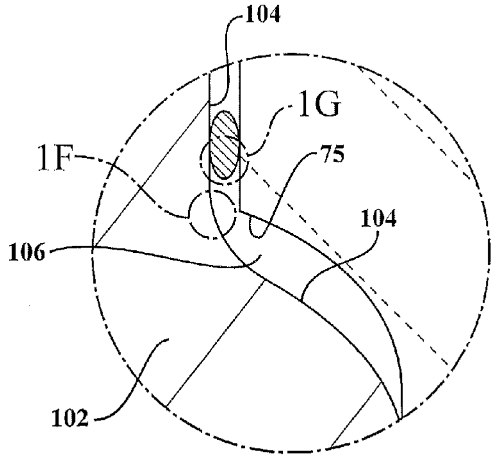
FIG. 1E is an enlarged view of a lower flange and a shell sealing gasket of FIG. 1A.
Figure 1F:
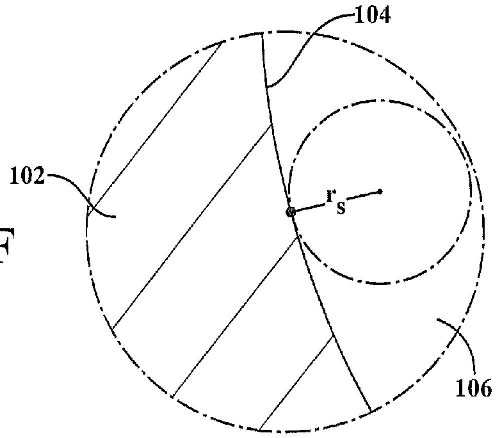
FIG. 1F is an enlarged view of a shell inner surface of the lower flange of FIG. 1E showing a spherical shell radius.
Figure 3C:
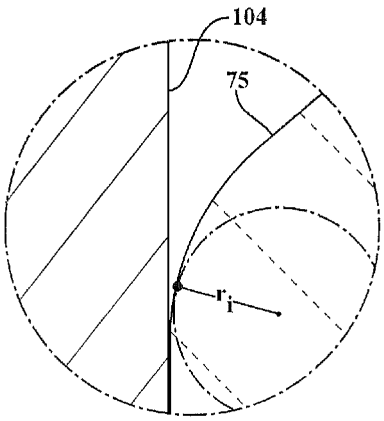
FIG. 3C is an enlarged view of an insulator inner surface of FIG. 3A showing a spherical insulator radius.
Figure 4A:
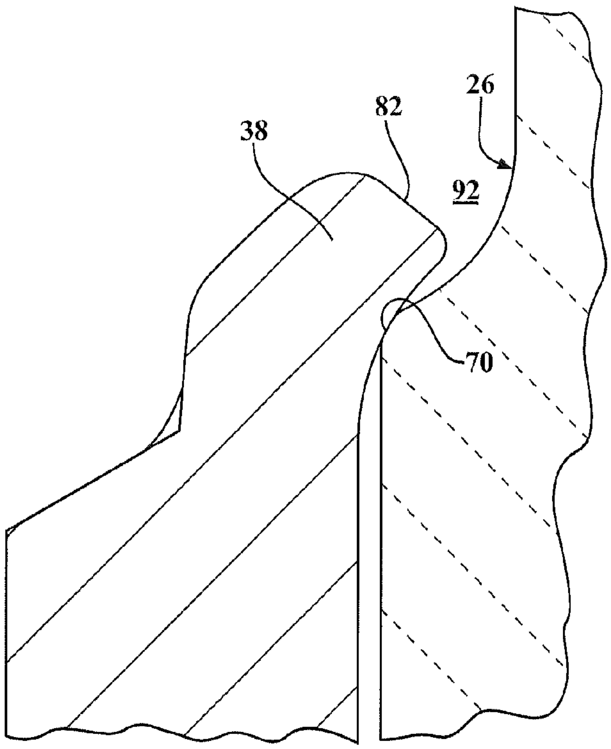
FIGS. 4A-4D are cross-sectional views of corona reducing lips of increasing spherical radii and contacting an insulator in accordance with another aspect of the invention.
Figure 4B:
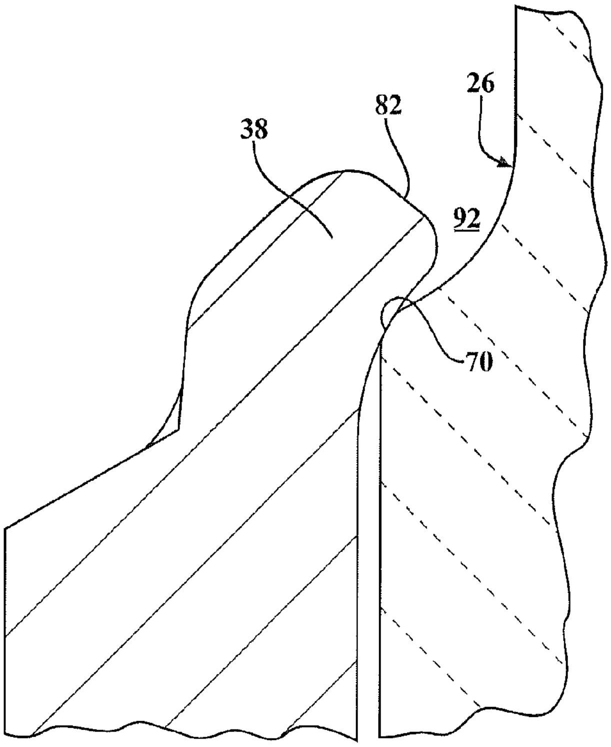
Figure 4C:
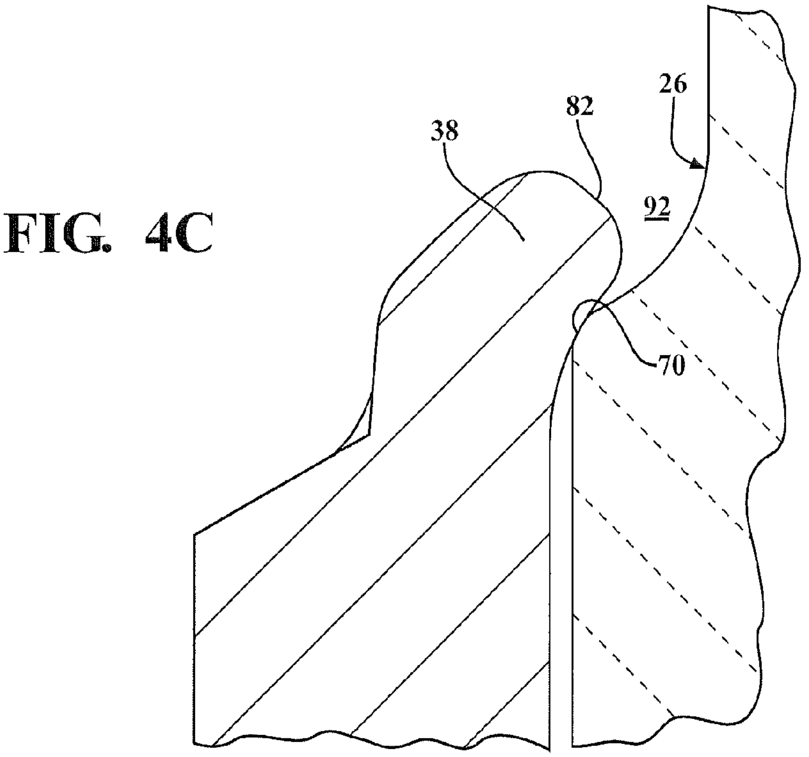
Figure 4D:
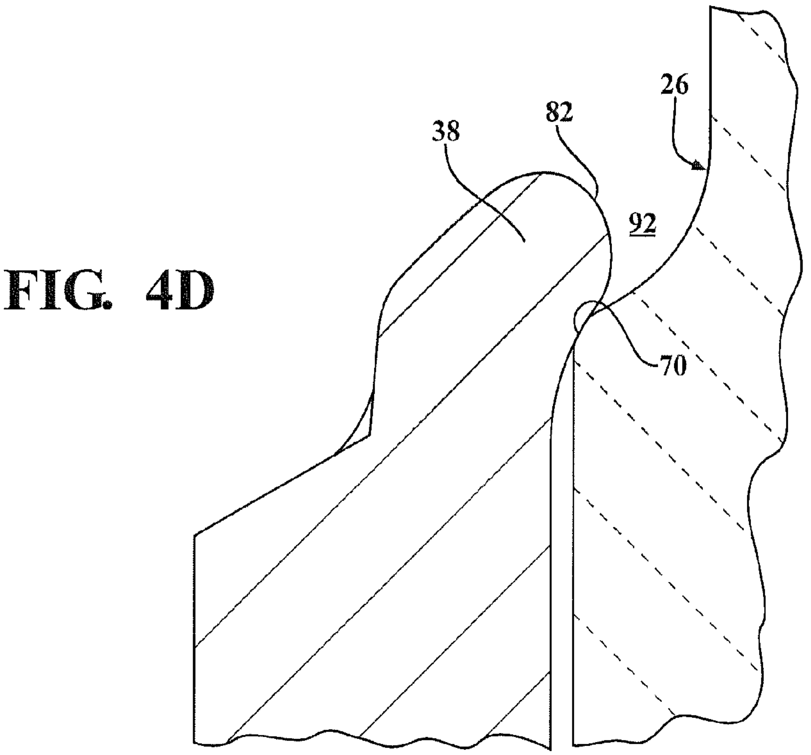
Figure 5A:
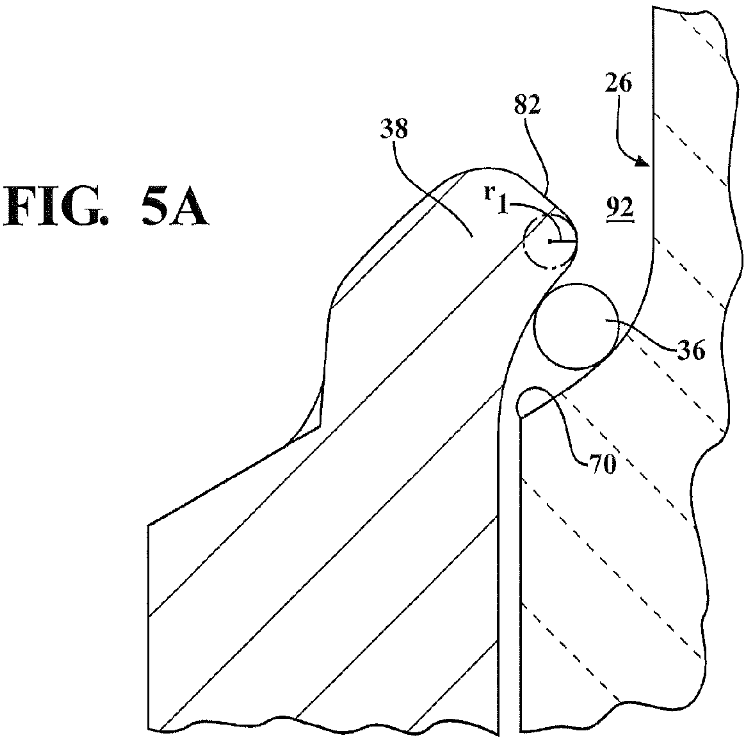
FIGS. 5A-5C are cross-sectional views of corona reducing lips of increasing spherical radii with a shell sealing gasket between the corona reducing lip and an insulator in accordance with another aspect of the invention.
Figure 5B:
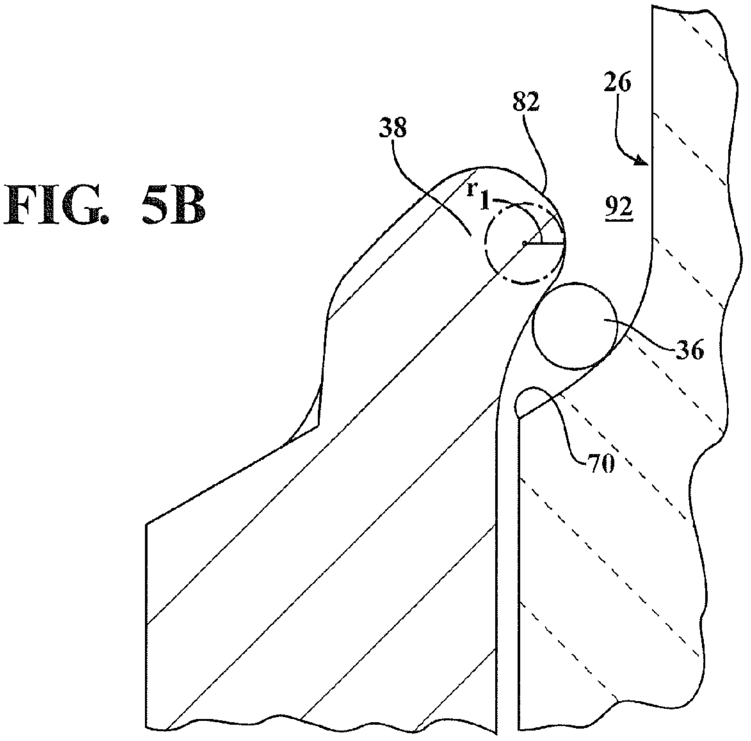
Figure 5C:
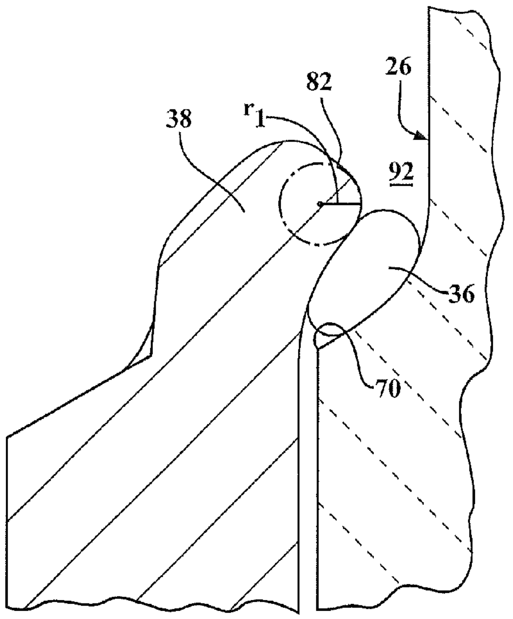

The free of sharp edges 40 feature of the corona reducing lip 38, the remaining portions of the shell 32, and the insulator 26 can be quantified by spherical radii $r_l$, $r_s$, $r_i$. Lip outer surfaces 88 of the corona reducing lip 38 present a plurality of spherical lip radii $r_l$ therealong; shell inner surfaces 104 of the shell 32, adjacent the corona reducing lip 38, and facing the insulator 26 present a plurality of spherical shell radii $r_s$ therealong; and insulator outer surfaces 75 of the insulator 26 facing the shell 32 present a plurality of spherical insulator radii $r_i$ therealong. The spherical radius $r_l$, $r_s$, $r_i$ at a particular point of the respective surface 75, 88, 104 is the radius of a hypothetical sphere having an outer surface aligned with the respective surface 75, 88, 104 at that particular point. The spherical radius $r_l$, $r_s$, $r_i$ n at that particular point is the radius of the hypothetical sphere in all three dimensions. A spherical radius $r_l$, $r_s$, $r_i$ of less than 0.004 inches is a sharp edge 40. FIGS. 1C and 1D illustrate a spherical lip radii $r_l$ at particular points of the corona reducing lip 38. FIGS. 4A-4D and FIGS. 5A-5C are cross-sectional views of corona reducing lips 38 with increasing spherical lip radii $r_l$. For example, the most inward spherical lip radii $r_l$ of FIG. 5C is greater than the most inward spherical lip radii $r_l$ of FIG. 5A. FIG. 1F illustrates a spherical shell radius $r_s$ at a particular point of the shell 32. FIG. 3C illustrates a spherical insulator radius $r_i$ at a particular point of the insulator 26.

The electrode 22 of the igniter 20 includes an electrode body portion 44 extending longitudinally from an electrode terminal end 46 to an electrode firing end 48, as shown in FIG. 1. The electrode body portion 44 is formed of an electrically conductive material, such as a nickel alloy. The electrode body portion 44 can include a core 50 formed of another electrically conductive material, such as copper. The electrode body portion 44 has a first heat transfer coefficient and the core 50 has a second heat transfer coefficient greater than the first heat transfer coefficient. The electrode body portion 44 has an electrode diameter $D_e$ extending generally perpendicular to the longitudinal electrode body portion 44.

The corona enhancing tip 24 is disposed at the electrode firing end 48 for emitting the electrical field that forms the corona in the air surrounding the electrode firing end 48. The corona enhancing tip 24 has a tip diameter $D_t$ extending generally perpendicular to the longitudinal electrode body portion 44. In one embodiment, the tip diameter $D_t$ is greater than the electrode diameter $D_e$. For example, the corona enhancing tip 24 can include a plurality of branches 52 extending from a platform 54 to distal ends 56. The corona enhancing tip 24 is typically formed of nickel, nickel alloy, copper, copper alloy, iron, or iron alloy. As shown in FIG. 1, the corona is formed by a plurality of streamers 58. The igniter 20 does not include any grounded electrode element in close proximity to the corona enhancing tip 24. Rather, the mixture of air and fuel is ignited along the entire length of the high electrical field generated from the corona enhancing tip 24.

The igniter 20 includes the insulator 26 disposed annularly around and longitudinally along the electrode body portion 44 from an insulator upper end 60 to an insulator nose end 62. The insulator nose end 62 is adjacent the electrode firing end 48 such that the insulator nose end 62 abuts the corona enhancing tip 24. The insulator 26 is formed of an electrically insulating material, such as alumina. The insulator 26 includes an insulator bore 64 for receiving the electrode 22.

As stated above, the insulator 26 includes the insulator outer surfaces 75 facing the shell 32 and preferably being free of sharp edges 40. The insulator outer surfaces 75 are rounded, concave, convex, and continuously curving along the shell 32. The insulator outer surfaces 75 present the spherical insulator radii n therealong, as shown in FIG. 3C, each being at least 0.004 inches.

In one embodiment, as shown in FIG. 1, the insulator 26 includes an insulator first region 66 extending along the electrode body portion 44 from the insulator upper end 60 toward the insulator nose end 62. The insulator first region 66 presents an insulator first diameter $D_1$ extending generally perpendicular to the longitudinal electrode body portion 44.

The insulator 26 of FIG. 1 also includes an insulator middle region 68 adjacent the insulator first region 66 and extending toward the insulator nose end 62. The insulator 26 presents an insulator upper shoulder 70 extending radially outwardly from the insulator first region 66 to the insulator middle region 68. The insulator middle region 68 presents an insulator middle diameter $D_m$ extending generally perpendicular to the longitudinal electrode body portion 44. The insulator middle diameter $D_m$ is greater than the insulator first diameter $D_1$.

The insulator 26 of FIG. 1 also includes an insulator second region 72 adjacent the insulator middle region 68 and extending toward the insulator nose end 62. The insulator 26 presents an insulator lower shoulder 74 extending radially inwardly from the insulator middle region 68 to the insulator second region 72. The insulator second region 72 presents an insulator second diameter $D_2$ extending generally perpendicular to the longitudinal electrode body portion 44. In the embodiment of FIG. 1, the insulator second diameter $D_2$ is less than the insulator first diameter $D_1$.

The insulator 26 includes an insulator nose region 76 extending from the insulator second region 72 to the insulator nose end 62. The insulator nose region 76 presents an insulator nose diameter $D_n$ extending generally perpendicular to the longitudinal electrode body portion 44 and tapering to the insulator nose end 62. In the embodiment of FIG. 1, the insulator nose diameter $D_n$ is less than the insulator second diameter $D_2$, and the insulator nose diameter $D_n$ at the insulator nose end 62 is less than the tip diameter $D_t$ of the corona enhancing tip 24.

The terminal 28 of the igniter 20 is received in the insulator bore 64. The terminal 28 extends from a first terminal end 78 to a second terminal end 80. The second terminal end 80 is adjacent to and in electrical communication with the electrode terminal end 46. The terminal 28 is also in electrical communication with a connecting wire (not shown) which is connected to a power source (not shown) for supplying a voltage to the igniter 20. The terminal 28 receives the voltage from the connecting wire and conveys the voltage to the electrode terminal end 46. The terminal 28 is formed of an electrically conductive material, such as a steel material. As shown in FIG. 1, the resistor layer 30 is disposed between the second terminal end 80 and the electrode terminal end 46 to provide the electrical connection between the second terminal end 80 of the terminal 28 and the electrode terminal end 46 of the electrode 22. The resistor layer 30 is formed of an electrically conductive material, such as a copper glass material, which suppresses electromagnetic interference.

The shell 32 is disposed annularly around the insulator 26 and includes a shell bore 81 for receiving the insulator 26. The shell 32 extends longitudinally from an upper shell end 82 along the insulator middle region 68 and the insulator second region 72 to a lower shell end 84 opposite the upper shell end 82. As stated above, the shell 32 includes the corona reducing lip 38 at the upper shell end 82. The upper shell end 82 is distal and is near the electrode terminal end 46 and faces toward the insulator upper end 60. The lower shell end 84 is near the insulator nose region 76 and the electrode firing end 48 and faces toward the electrode firing end 48. In one embodiment, as shown in FIG. 1, the upper shell end 82 is adjacent the insulator upper shoulder 70. The insulator first region 66 projects outwardly of the upper shell end 82 and the insulator nose region 76 projects outwardly of the lower shell end 84. The shell 32 includes a plurality of the shell inner surfaces 104 adjacent the corona reducing lip 38 and facing the insulator 26. The shell 32 is formed of a metal material having a ductility such that the material can be formed into a variety of shapes or bent, such as a carbon steel material. In one embodiment, the metal material of the shell 32 has a ductility of 0.02 to 0.06, and preferably at least 0.04, according to S.I. units of measurement.

The shell 32 includes a tool receiving member 86 extending along the insulator middle region 68 from the insulator upper shoulder 70 to the insulator lower shoulder 74. The tool receiving member 86 is used to install and remove the igniter 20 in the cylinder head (not shown). The tool receiving member 86 presents tool thicknesses $t_t$, shown in FIG. 1A, extending generally perpendicular to the longitudinal electrode body portion 44. The design of the tool receiving member 86 can vary, depending on industry standards for the desired application.

The shell 32 includes the upper flange 34 in the rollover region, extending longitudinally from the tool receiving member 86, along the insulator upper shoulder 70, to the upper shell end 82. The upper flange 34 also extends annularly around the insulator 26. The upper flange 34 can fix the shell 32, at least in part, against relative axial movement with the insulator 26.

As stated above, the upper flange 34 includes the corona reducing lip 38 at the upper shell end 82 extending annularly around the insulator upper shoulder 70. The corona reducing lip 38 is a distal portion of the upper flange 34, and typically comprises the entire upper flange 34, as shown in FIG. 1, or at least portion of the upper flange 34. The corona reducing lip 38 includes a plurality of lip thicknesses $t_l$ extending generally perpendicular to the longitudinal electrode body portion 44. Typically each of the lip thicknesses $t_l$ are less than the tool thicknesses $t_t$, as shown in FIG. 1A. In one embodiment, as shown in FIG. 4A, a portion of the corona reducing lip 38 is pressed against the insulator upper shoulder 70 and fixes the shell 32 against relative axial movement with the insulator 26. However, the corona reducing lip 38 is spaced from the insulator 26 at the upper shell end 82 and presents a first space 92 therebetween.

Figure 2:
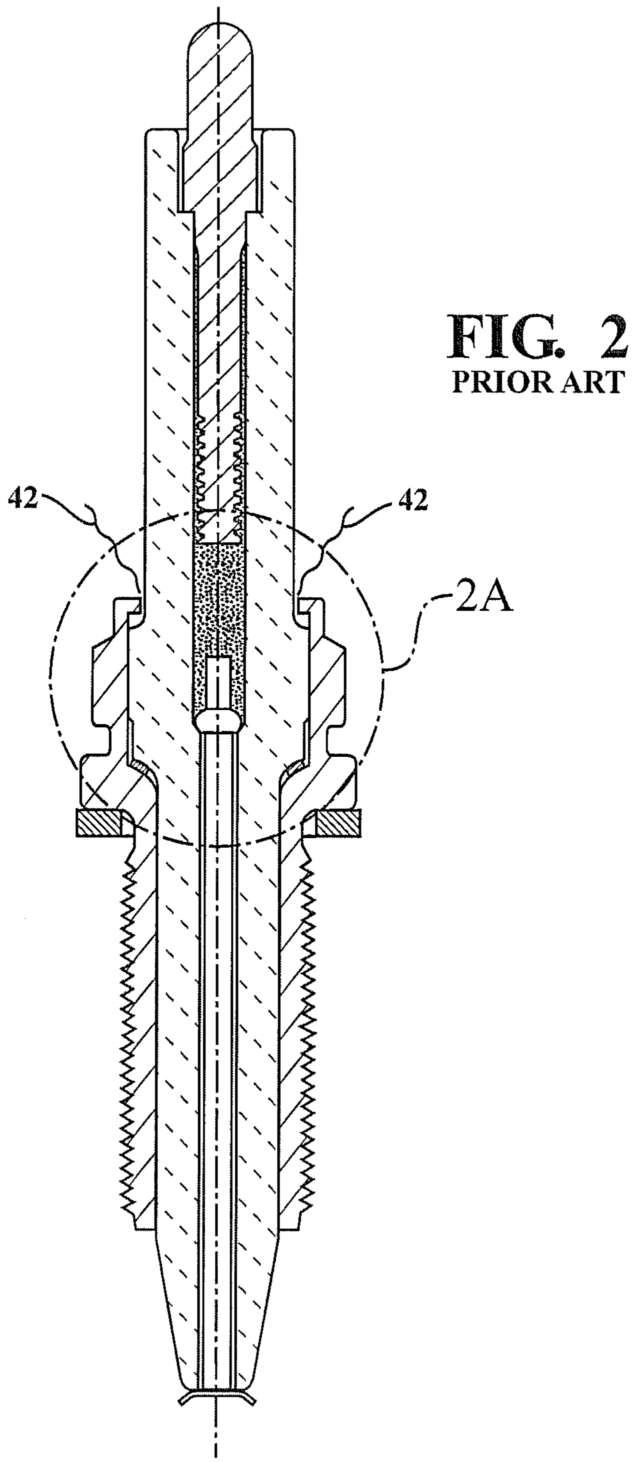
FIG. 2 PRIOR ART
FIG. 2 is a cross-sectional view of an igniter of the prior art.
Figure 2A:
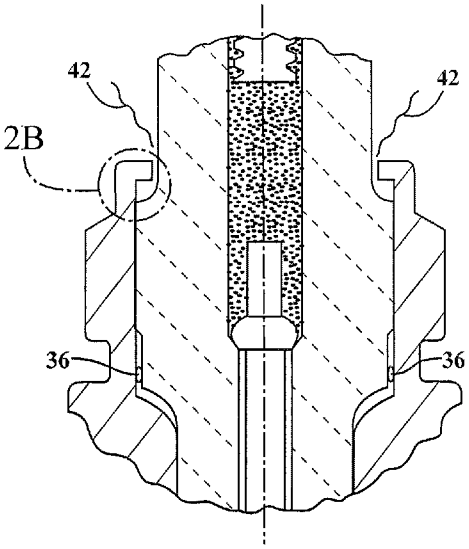
FIG. 2A PRIOR ART
FIG. 2A is an enlarged view of a rollover region of the igniter of FIG. 2.
Figure 2B:
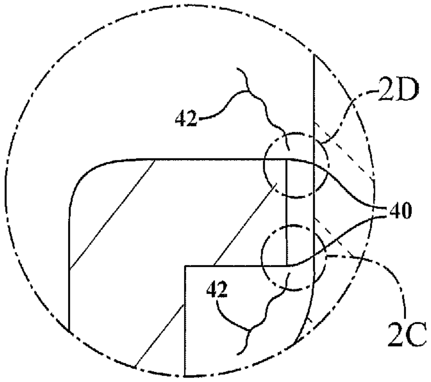
FIG. 2B PRIOR ART
FIG. 2B is an enlarged view of a lip of the rollover region of FIG. 2A.
Figure 2C:
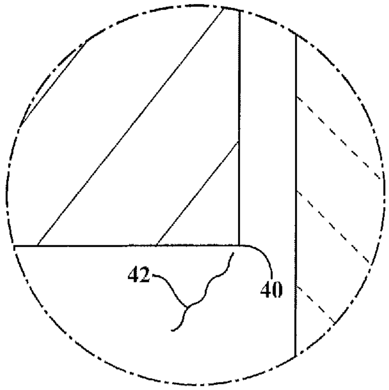
FIG. 2C PRIOR ART
FIG. 2C is an enlarged view of a portion of the lip of FIG. 2B showing a sharp edge.

As stated above, the corona reducing lip 38 is free of sharp edges 40, unlike the prior art igniter of FIG. 2, which includes a lip with sharp edges 40 in the rollover region. The corona reducing lip 38 of the inventive igniter 20 includes the plurality of lip outer surfaces 88, as shown in FIG. 1B, each being free of sharp edges 40. The corona reducing lip 38 includes smooth transitions 90 between the lip outer surfaces 88. There are no corners or abrupt changes between the lip outer surfaces 88 of the corona reducing lip 38. In one preferred embodiment, at least one of the lip outer surfaces 88 is round, as shown in FIG. 1. The lip outer surfaces 88 can also be convex or concave.

The free of sharp edges 40 feature of the corona reducing lip 38 can be quantified by a spherical lip radius $r_1$, as described above. The lip outer surfaces 88 of the corona reducing lip 38 each present a plurality of the spherical lip radii $r_l$ therealong. The spherical lip radius $r_l$ at a particular point of the lip outer surface 88 is the radius of a hypothetical sphere having an outer surface aligned with the lip outer surface 88 of the corona reducing lip 38 at that particular point. The spherical lip radius $r_l$ at that particular point is the radius of the hypothetical sphere in all three dimensions. FIGS. 1C and 1D illustrate spherical lip radii $r_l$ at particular points of the corona reducing lip 38.

Figure 2D:
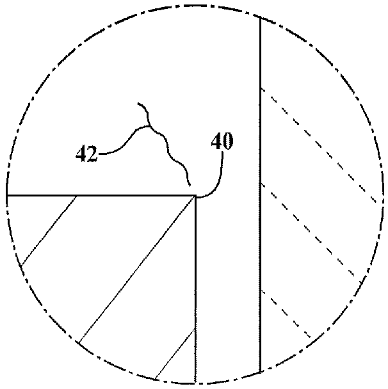
FIG. 2D PRIOR ART
FIG. 2D is an enlarged view of another portion of the lip of FIG. 2B showing another sharp edge.

Each spherical lip radii n of the corona reducing lip 38 is at least 0.004 inches, preferably at least 0.005 includes, more preferably 0.01 inches, more preferably at least 0.015 inches, and even more preferably at least 0.02 inches. The corona reducing lip 38 is free of sharp edges 40 if each spherical lip radii $r_l$ of the corona reducing lip 38 is least 0.004 inches. A spherical lip radius $r_l$ of less than 0.004 inches is a sharp edge 40. The prior art igniter shown in FIGS. 2-2D includes a lip having spherical radii less than 0.004 inches, which are sharp edges. In one embodiment, the spherical lip radius $r_l$ closest to the insulator 26 is greater than every other spherical lip radius $r_l$ of the corona reducing lip 38. In another embodiment, the spherical lip radius $r_l$ closest to the insulator upper end 60 is greater than every other spherical lip radius $r_l$ of the corona reducing lip 38. FIGS. 4A-4D and FIGS. 5A-5C are cross-sectional views of several embodiments of the corona reducing lip 38 showing presenting the lip outer surface 88 closet to the insulator 26 with gradually increasing spherical lip radii $r_l$. For example, the spherical lip radii $r_l$ of FIG. 4D is greater than the spherical lip radii $r_l$ of FIG. 4A. FIG. 4A has a spherical lip radius $r_l$ of 0.005 inches; FIG. 4B has a spherical lip radius $r_l$ of 0.010 inches; FIG. 4C has a spherical lip radius $r_l$ of 0.015 inches; and FIG. 4D has a spherical lip radius of 0.020 inches.

Figure 7:
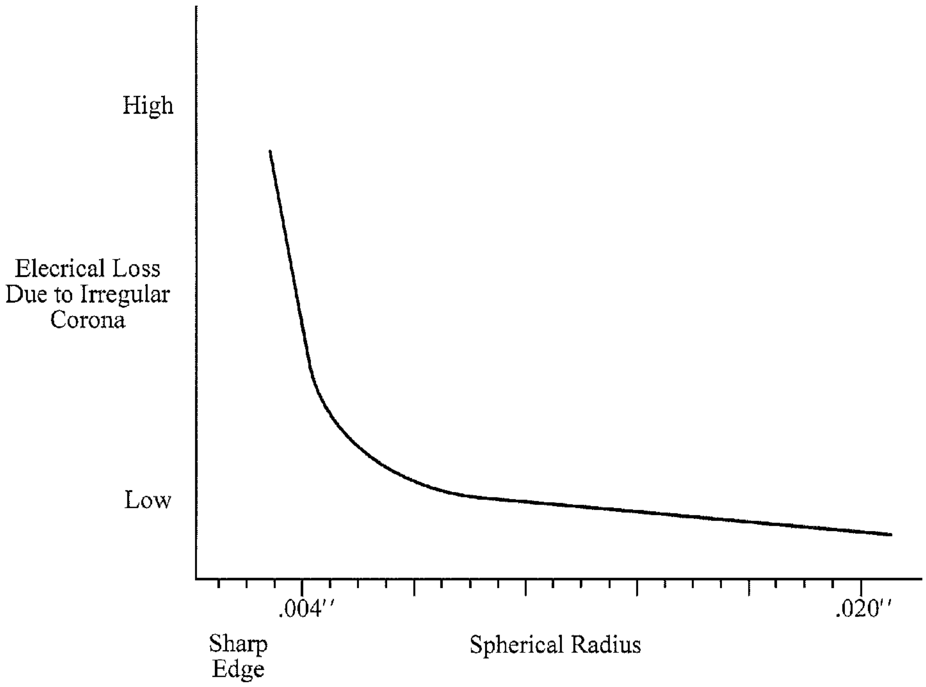
FIG. 7 is a graph showing a relationship between spherical lip radius an electric field strength.

Due to the corona reducing lip 38 being free of sharp edges 40 and being spaced from the insulator 26 at the upper shell end 82, the igniter 20 provides less undesirable corona emissions in the rollover region, compared to the prior art igniters of the '942 published application, which include sharp edges 40 in the rollover region. FIG. 7 is a graph showing a relationship between the spherical lip radii $r_l$ of a corona reducing lip 38 spaced from an insulator 26, like the corona reducing lip 38 of FIGS. 4A-4D, and the electrical loss due to a streamer or irregular corona emitted from the corona reducing lip 38 at the spherical lip radii $r_l$. The electrical loss is determined by measuring the electrical field strength of the irregular corona. A higher spherical lip radius $r_l$ equals a lower electrical field strength and lower electrical loss, which is desirable to prevent arcing 42 in the rollover region. FIG. 7 shows the electrical loss increases exponentially when the spherical lip radii $r_l$ decreases to less than 0.004 inches. The exponential increase indicates undesirable arcing 42 typically occurs if the spherical lip radii $r_l$ is less than 0.004 inches.

Due the corona reducing lip 38 being free of sharp edges 40, the electrical field emissions from the inventive igniter 20 are more concentrated and maximized at the electrode firing end 48. Thus, the inventive igniter 20 can emit a more consistent and stronger electrical field from the electrode firing end 48, compared to the prior art igniters. For example, the inventive igniter 20 according to one embodiment emits a stronger electrical field from the electrode firing end 48 at 30 volts than the prior art igniters of the '942 published application do at 50 volts. The corona reducing lip 38 also reduces mechanical and electrical stress on the insulator 26 of the igniter 20, compared to lips of the prior art with sharp edges 40 pressed against the insulator, such as the lip of prior art FIG. 2. Thus, the inventive igniter 20 is more efficient and provides significant energy cost savings relative to the prior art igniters. The inventive igniter 20 can also provide a higher quality ignition and better, more stable performance over time than the prior art igniters.

Figure 3:
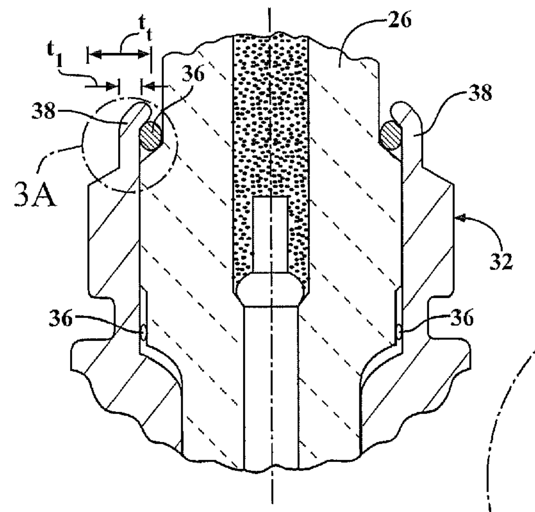
FIG. 3 is a cross-sectional view of a rollover region of an igniter in accordance with another aspect of the invention wherein a shell sealing gasket is disposed between the corona reducing lip and the insulator.
Figure 3A:
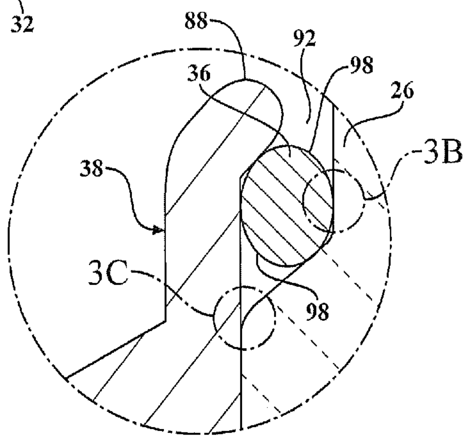
FIG. 3A is an enlarged view of the corona reducing lip and the shell sealing gasket of FIG. 3.
Figure 3B:
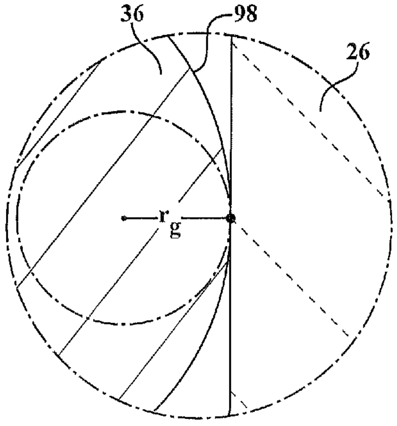
FIG. 3B is an enlarged view of the shell sealing gasket of FIG. 3A showing a spherical gasket radius.

The corona reducing lip 38 can comprise a variety of shapes, as shown in FIGS. 1-1D, 3-3A, 4A-4D, and 5A-5C, each being free of sharp edges 40. The corona reducing lip 38 of FIG. 1B presents lip outer surfaces 88 forming a bulbous shape. The corona reducing lip 38 of FIG. 3A presents a lip outer surface 88 having a round and convex shape at the upper shell end 82.

The corona reducing lip 38 is spaced from the insulator 26 at the upper shell end 82 to present the first space 92 therebetween. The first space 92 between the upper shell end 82 and the insulator 26 prevents the undesirable arcing 42 in the air surrounding the upper shell end 82, as shown in the prior art FIG. 2. The entire corona reducing lip 38 of FIG. 1A is spaced from the insulator 26 and extends longitudinally from the tool receiving member 86, along the insulator upper shoulder 70, to the upper shell end 82. The entire corona reducing lip 38 of FIGS. 3 and 5A-5C is spaced from the insulator 26 by a sealing gasket 36. In another embodiment, at least a portion of the corona reducing lip 38 contacts the insulator 26 at the insulator upper shoulder 70. In the embodiment of FIGS. 4A-4D, the corona reducing lip 38 is pressed against the insulator upper shoulder 70 for fixing the shell 32 to the insulator 26 and limiting axial movement of the shell 32 relative to the insulator 26, but the corona reducing lip 38 is spaced from the insulator 26 at the upper shell end 82.

The corona reducing lip 38 of FIG. 1B includes a stem 94 curled or bent radially inwardly toward and about the insulator upper shoulder 70. The corona reducing lip 38 also includes a bulb 96 extending radially inwardly from the stem 94 to the upper shell end 82. The corona reducing lip 38 includes continuously curving convex and concave lip outer surfaces 88 to form the stem 94 and the bulb 96. The lip outer surfaces 88 include smooth transitions 90 between the stem 94 and the bulb 96. The stem 94 and the bulb 96 are spaced from the insulator 26 to present the first space 92 therebetween, such that neither the stem 94 or the bulb 96 touch the insulator 26. The lip thicknesses $t_l$ of the bulb 96 are greater than the lip thicknesses $t_l$ of the stem 94.

The shell 32 also includes a lower flange 102 depending from the tool receiving member 86, opposite the upper flange 34. The lower flange 102 extends radially outwardly of the insulator 26 adjacent the tool receiving member 86. The lower flange 102 extends annularly around and longitudinally along the insulator lower shoulder 74. Preferably, the shell inner surfaces 104 of the lower flange 102 are spaced from the insulator 26 to present a second space 106 therebetween. However, at least one of the shell inner surfaces 104 of the lower flange 102 can engage the insulator second region 72 to fix the shell 32 against relative axial movement with the insulator 26. The shell inner surfaces 104 of the lower flange 102 are preferably free of sharp edges 40, as shown in FIGS. 1E and 1F, and are concave, convex, and continuously curving about the insulator lower shoulder 74.

Preferably, each of the shell inner surfaces 104 adjacent the corona reducing lip 38 and facing the insulator 26 are spaced from the insulator 26 and are free of sharp edges 40 to prevent undesired electrical emissions between the shell 32 and the insulator 26. The shell inner surfaces 104 present the plurality of spherical shell radii $r_s$ therealong, as shown in FIG. 1F, each being at least 0.004 inches. In the embodiment of FIG. 1, the spherical shell radius $r_s$ closest to the insulator lower shoulder 74 is greater than every other spherical shell radii $r_s$ of the shell inner surface 104. The spherical shell radii $r_s$ are measured in the same manner as the spherical lip radii $r_l$, discussed above.

As shown in FIG. 1, the lower flange 102 presents a shell sealing seat 108 generally planar and facing toward the lower shell end 84. The shell 32 includes a plurality of threads 112 depending from the lower flange 102. The threads 112 are used to secure the igniter 20 in the cylinder head (not shown). The threads 112 extend along the insulator second region 72 to the lower shell end 84.

Figure 1G:
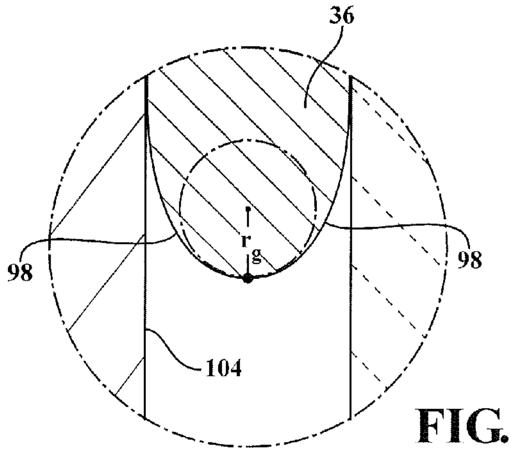
FIG. 1G is an enlarged view of the shell sealing gasket of FIG. 1E showing a spherical gasket radius.

As alluded to above, in several embodiments, as shown in FIGS. 3 and 5A-5C, the igniter 20 includes one of the shell sealing gaskets 36 disposed annularly around the insulator 26 between the insulator 26 and the shell 32 to seal the space between the insulator 26 and the shell 32 and fix the shell 32 against relative axial movement with the insulator 26. Preferably, the shell sealing gaskets 36 space the insulator 26 from the shell 32 such that the insulator 26 and the shell 32 do not contact one another. One of the shell sealing gaskets 36 can be disposed between the corona reducing lip 38 and the insulator 26, as shown in FIG. 3. The corona reducing lip 38 is typically disposed radially outwardly of the shell sealing gasket 36. Another one of the shell sealing gaskets 36 can be disposed between the tool receiving member 86 and the insulator middle region 68, as shown in FIG. 1A, 1E, and 1G. One of the shell sealing gaskets 36 can also be disposed on the shell sealing seat 108, as shown in FIG. 1, to facilitate a hot gas seal between the igniter 20 and the cylinder head (not shown). The shell sealing gaskets 36 can be formed of conductive metal materials, such as steel.

The shell sealing gaskets 36 include a plurality of sealing gasket outer surfaces 98, preferably being round, smooth, and free of sharp edges 40, as shown in FIG. 1G. The sealing gasket outer surfaces 98 present a plurality of sealing gasket spherical radii $r_g$ therealong, as shown in FIG. 1G. Preferably, each sealing gasket spherical radii $r_g$ is at least 0.004 inches. The sealing gasket spherical radii $r_g$ are measured in the same manner as the spherical lip radii $r_l$ discussed above.

The invention also provides a method of forming the igniter 20 for receiving a voltage from a power source and emitting an electrical field that forms a corona to ionize a mixture of fuel and air of an internal combustion engine. The method first includes providing the shell 32 extending longitudinally from the upper shell end 82 to the lower shell end 84.

The method also includes forming the corona reducing lip 38 at the upper shell end 82 to be free of sharp edges 40. Any sharp edges 40 initially present in the rollover region of the shell 32 can be removed by machining to form the corona reducing lip 38. In one embodiment, the method includes machining the corona reducing lip 38 to present the bulb 96 being round at the upper shell end 82 and the stem 94 depending from the bulb 96. A molding process can also be used to form the shell 32 with the corona reducing lip 38 free of sharp edges 40. The method also includes forming the shell 32 to include shell inner surfaces 104 adjacent the corona reducing lip 38 to be free of sharp edges 40, and forming the insulator to include insulator outer surfaces 75 being free of sharp edges 40.

The method then includes disposing the insulator 26 in the shell 32 such that the insulator outer surfaces 75 face the shell inner surfaces 104. The method next includes moving the upper shell end 82 radially inward toward the insulator 26, such that the corona reducing lip 38 is bent radially inward. The step of moving the upper shell end 82 can be done after disposing the shell sealing gasket 36 between the insulator 26 and the shell 32.

Figure 6A:
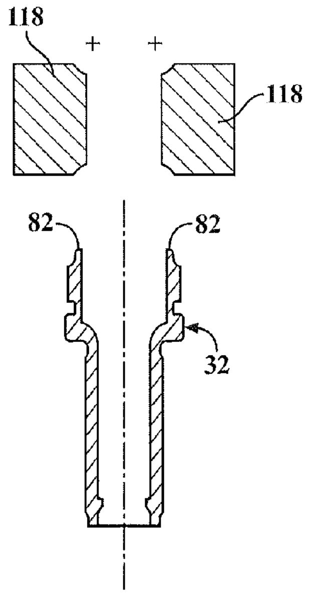
FIGS. 6A-6C illustrate method steps forming an igniter according to another aspect of the invention.
Figure 6B:
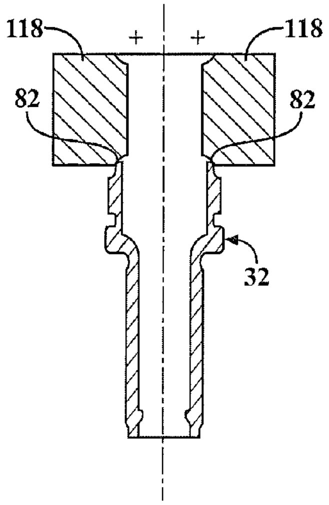
Figure 6C:
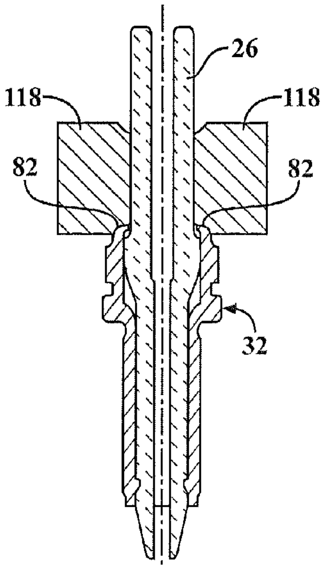

As shown in FIGS. 6A-6B, a turnover die 118 can be used to move the upper shell end 82 toward the insulator 26. First, the turnover die 118 is lowered to engage the upper shell end 82, followed by disposing the insulator 26 in the shell 32, and then pressing the turnover die 118 downwardly on the upper shell end 82 to bend the corona reducing lip 38 and move the upper shell end 82 radially inward toward the insulator 26. The turnover die 118 is pressed downwardly on the upper shell end 82 until the corona reducing lip 38 is secured against the insulator 26. In one embodiment, the corona reducing lip 38 is pressed such that the shell 32 remains fixed to the insulator 26 after the turnover die 118 is lifted from the upper shell end 82.

The method also includes disposing the electrode 22 including the electrode body portion 44 extending longitudinally from the electrode terminal end 46 to the electrode firing end 48 in the insulator 26. The electrode 22 is disposed in the insulator 26 such that the electrode terminal end 46 faces toward the insulator upper end 60 and the lower shell end 84 faces toward the electrode firing end 48.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. In addition, the reference numerals in the claims are merely for convenience and are not to be read in any way as limiting.

The invention claimed is:

1. A method of forming an igniter for receiving a voltage from a power source and emitting an electrical field that forms a corona to ionize a mixture of fuel and air of an internal combustion engine comprising the steps of:

providing a shell extending longitudinally from an upper shell end to a lower shell end;

disposing an insulator in the shell;

disposing an electrode including an electrode body portion extending longitudinally from an electrode terminal end to an electrode firing end in the insulator such that the electrode firing end faces toward the lower shell end; and forming a corona reducing lip at the upper shell end to be free of sharp edges, wherein the corona reducing lip includes a lip outer surface presenting a plurality of spherical lip radii therealong, and each of the spherical lip radii is not less than 0.004 inches.

2. A method as set forth in claim 1 wherein the forming the corona reducing lip includes removing sharp edges at the upper shell end.

3. A method as set forth in claim 1 including forming the shell to include a shell inner surface adjacent the corona reducing lip and facing the insulator to be free of sharp edges.

4. A method as set forth in claim 1 including forming the insulator to include an insulator outer surface facing the shell and being free of sharp edges.

5. A method as set forth in claim 1 including moving the upper shell end radially inwardly.

6. A method as set forth in claim 1 wherein each of the spherical lip radii is at least 0.005 inches.

7. A method as set forth in claim 1 wherein the lip outer surface is round.

8. A method as set forth in claim 1 wherein the corona reducing lip presents smooth transitions between different sections of the lip outer surface.

9. A method as set forth in claim 1 wherein the upper shell end is distal and the corona reducing lip is spaced from the insulator at the upper shell end.

10. A method as set forth in claim 1 wherein the corona reducing lip includes a stem extending radially inwardly toward the insulator and a bulb at the upper shell end and wherein lip thicknesses $t_1$ of the bulb is greater than lip thicknesses $t_1$ of the stem and wherein the lip outer surface of the bulb is rounded.

11. A method as set forth in claim 1 wherein the shell presents a shell inner surface extending from the corona reducing lip to the lower shell end, the shell inner surface facing the insulator and being free of sharp edges.

12. A method as set forth in claim 11, wherein the shell inner surface presents a plurality of spherical shell radii therealong and each of the spherical shell radii is at least 0.004 inches.

13. A method as set forth in claim 1 wherein the insulator presents an insulator outer surface facing the shell and being free of sharp edges.

14. A method as set forth in claim 13 wherein the insulator outer surface presents a plurality of spherical insulator radii therealong and each of the spherical insulator radii is at least 0.004 inches.

15. A method as set forth in claim 1 including a shell sealing gasket being free of sharp edges disposed between the shell and the insulator.

16. A method of forming an igniter for receiving a voltage from a power source and emitting an electrical field that forms a corona to ionize a mixture of fuel and air of an internal combustion engine comprising the steps of:

providing a shell extending longitudinally from an upper shell end to a lower shell end;

disposing an insulator in the shell;

disposing an electrode including an electrode body portion extending longitudinally from an electrode terminal end to an electrode firing end in the insulator such that the electrode firing end faces toward the lower shell end;

forming a corona reducing lip at the upper shell end to be free of sharp edges, wherein the corona reducing lip includes a lip outer surface presenting a plurality of spherical lip radii therealong, and each of the spherical lip radii is at least 0.004 inches; and wherein the electrode body portion has an electrode diameter generally perpendicular to the longitudinal electrode body portion; the electrode includes a corona enhancing tip at the electrode firing end having a tip diameter generally perpendicular to the longitudinal electrode body portion; the tip diameter is greater than the electrode diameter; and the corona enhancing tip including a plurality of branches each extending away from the shell to a distal end.

17. A method as set forth in claim 16 wherein the insulator includes an insulator nose region presenting an insulator nose diameter generally perpendicular to the longitudinal electrode body portion and tapering to an insulator nose end; and the insulator nose diameter at the insulator nose end is less than the tip diameter of the corona enhancing tip.

18. A method of forming an igniter for receiving a voltage from a power source and emitting an electrical field that forms a corona to ionize a mixture of fuel and air of an internal combustion engine comprising the steps of:

providing a shell extending longitudinally from an upper shell end to a lower shell end;

disposing an insulator in the shell;

disposing an electrode including an electrode body portion extending longitudinally from an electrode terminal end to an electrode firing end in the insulator such that the electrode firing end faces toward the lower shell end;

forming a corona reducing lip at the upper shell end to be free of sharp edges, wherein the corona reducing lip includes a lip outer surface presenting a plurality of spherical lip radii therealong, and each of the spherical lip radii is at least 0.004 inches; and wherein the electrode is formed of an electrically conductive material; the electrode body portion has an electrode diameter generally perpendicular to the longitudinal electrode body portion; the electrode including a corona enhancing tip at the electrode firing end having a tip diameter extending generally perpendicular to the longitudinal electrode body portion; the tip diameter being greater than the electrode diameter; the insulator is disposed annularly around and longitudinally along the electrode body portion from an insulator upper end to an insulator nose end adjacent the electrode firing end such that the insulator nose end abuts the corona enhancing tip; the insulator including an insulator nose region presenting an insulator nose diameter generally perpendicular to the longitudinal electrode body portion and tapering to the insulator nose end; the insulator nose diameter at the insulator nose end being less than the tip diameter; a terminal received in the insulator and in electrical communication with the electrode terminal end; the terminal extending from a first terminal end to a second terminal end being in electrical communication with the electrode terminal end; the terminal formed of an electrically conductive material; a resistor layer disposed between and electrically connecting the second terminal end and the electrode terminal end; the resistor layer formed of an electrically conductive material; the shell is disposed annularly around the insulator; the shell is formed of a metal material; the shell extends longitudinally along the insulator such that the insulator nose region projects outwardly of the lower shell end; and the corona reducing lip presents a lip outer surfaces having a plurality of sections with smooth transitions therebetween.

* * * * *